(12) United States Patent
Matero

(10) Patent No.: US 7,254,592 B1
(45) Date of Patent: Aug. 7, 2007

(54) METHOD AND ARRANGEMENT FOR PERFORMING ATOMIC UPDATES USING A LOGICAL FLASH MEMORY DEVICE

(75) Inventor: Jari Matero, Masala (FI)

(73) Assignee: Tellabs Oy, Espoo (FI)

( * ) Notice: Subject to any disclaimer, the term of this patent is extended or adjusted under 35 U.S.C. 154(b) by 457 days.

(21) Appl. No.: 10/110,418

(22) PCT Filed: Oct. 25, 2000

(86) PCT No.: PCT/FI00/00921
§ 371 (c)(1),
(2), (4) Date: Jun. 26, 2002

(87) PCT Pub. No.: WO01/31458
PCT Pub. Date: May 3, 2001

(30) Foreign Application Priority Data
Oct. 26, 1999 (FI) .................................. 19992308

(51) Int. Cl.
*G06F 12/16* (2006.01)
(52) U.S. Cl. ....................... 707/203; 711/103
(58) Field of Classification Search ............... 711/103; 707/101, 203; 714/2
See application file for complete search history.

(56) References Cited

U.S. PATENT DOCUMENTS 5,524,230 A    6/1996 Sakaue et al.
5,832,493 A    11/1998 Marshall et al.
5,954,818 A    9/1999 Dalvi et al.
6,035,401 A    3/2000 Dalvi et al.

FOREIGN PATENT DOCUMENTS

EP        0762282 A1    3/1997

OTHER PUBLICATIONS

Michael Wu et al., eNVy; A Non-Volatile, Main Memory Storage System, ACM, 1994, pp. 1-12.*
Abraham Silberschatz, et al., "Operating System Concepts", 1994, Addison-Wesley Publishing, Fourth Edition, 8 pages.*

* cited by examiner

*Primary Examiner*—Paul Rodriguez
*Assistant Examiner*—Luke Osborne
(74) *Attorney, Agent, or Firm*—Young & Thompson

(57) ABSTRACT

A method and an arrangement are provided for updating a first block of digital data (601) by performing a number of update operations which must either all succeed together or all fail together. The number of update operations is greater than or equal to one. A first identifier (TID) is activated (701) which is common to all those update operations that concern the first block of data and must either all succeed together or all fail together. All those update operations are performed (703) that concern the first block of data and must either all succeed together or all fail together. The updated first block of digital data is stored (707) into a logical flash memory device (1101) together with a value that associates the updated first block of data with the first identifier. The first identifier is deactivated (710).

4 Claims, 10 Drawing Sheets

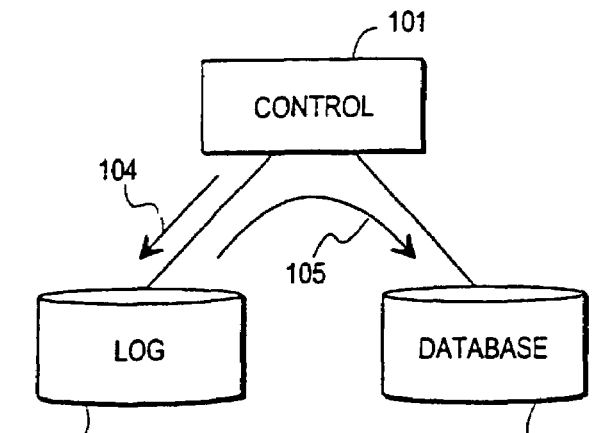
Fig. 1
PRIOR ART
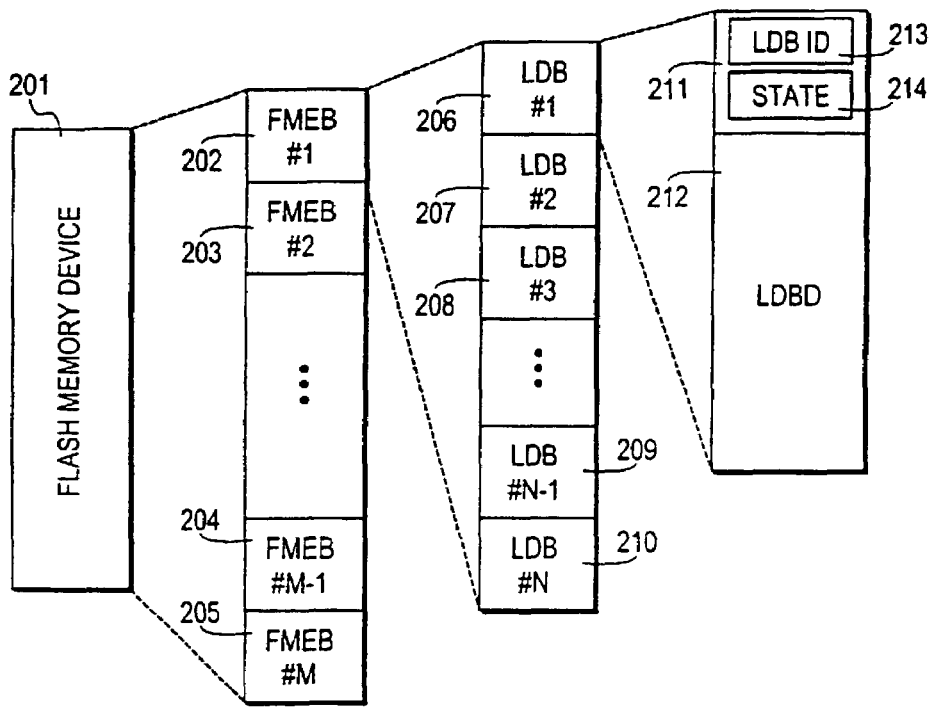
Fig. 2
PRIOR ART
| LDB ID | LDB ID | LDB ID | LDB ID | ... |
|---------|---------|---------|---------|-----|
| ADDRESS | ADDRESS | ADDRESS | ADDRESS | |
Fig. 3
PRIOR ART

| LDB#X | | TID#A | A2 | A2 | A2 | A2 | B1 | B1 | B1 | B1 | C1 | C1 | C1 | C1 | 841 |
|---|---|---|---|---|---|---|---|---|---|---|---|---|---|---|---|
| LDB#X | | TID#B | A2 | A2 | A2 | A2 | B2 | B2 | B2 | B2 | C1 | C1 | C1 | C1 | 842 |
| LDB#X | | TID#C | A2 | A2 | A2 | A2 | B2 | B2 | B2 | B2 | C1 | C2 | C2 | C2 | 843 |

| LDB#X | D | TID#? | A1 | A1 | A1 | A1 | B1 | B1 | B1 | B1 | C1 | C1 | C1 | C1 | 800 |
|---|---|---|---|---|---|---|---|---|---|---|---|---|---|---|---|

| LDB#X | V | TID#A | A2 | A2 | A2 | A2 | B1 | B1 | B1 | B1 | C1 | C1 | C1 | C1 | 810 |
|---|---|---|---|---|---|---|---|---|---|---|---|---|---|---|---|
| LDB#X | T | TID#B | A2 | A2 | A2 | A2 | B2 | B2 | B2 | B2 | C1 | C1 | C1 | C1 | 820 |
| - | U | - | - | - | - | - | - | - | - | - | - | - | - | - | 830 |

| | TID#B | TID#C | | 850 |
|---|---|---|---|---|

Fig. 9e

| LDB#X | | TID#A | A2 | A2 | A2 | A2 | B1 | B1 | B1 | B1 | C1 | C1 | C1 | C1 | 841 |
|---|---|---|---|---|---|---|---|---|---|---|---|---|---|---|---|
| LDB#X | | TID#B | A2 | A2 | A2 | A2 | B2 | B2 | B2 | B2 | C1 | C1 | C1 | C1 | 842 |
| LDB#X | | TID#C | A2 | A2 | A2 | A2 | B2 | B2 | B2 | B2 | C1 | C2 | C2 | C2 | 843 |

| LDB#X | D | TID#? | A1 | A1 | A1 | A1 | B1 | B1 | B1 | B1 | C1 | C1 | C1 | C1 | 800 |
|---|---|---|---|---|---|---|---|---|---|---|---|---|---|---|---|

| LDB#X | D | TID#A | A2 | A2 | A2 | A2 | B1 | B1 | B1 | B1 | C1 | C1 | C1 | C1 | 810 |
|---|---|---|---|---|---|---|---|---|---|---|---|---|---|---|---|
| LDB#X | V | TID#B | A2 | A2 | A2 | A2 | B2 | B2 | B2 | B2 | C1 | C1 | C1 | C1 | 820 |
| LDB#X | W | TID#C | - | - | - | - | - | - | - | - | - | - | - | - | 830 |

| | | TID#C | | 850 |
|---|---|---|---|---|

Fig. 9f

| LDB#X | V | TID#? | A1 | A1 | A1 | A1 | A1 | A1 | A1 | A1 | A1 | A1 | A1 | ⟩1000
|---|---|---|---|---|---|---|---|---|---|---|---|---|---|---
| | U | | | | | | | | | | | | | ⟩1010
| | U | | | | | | | | | | | | | ⟩1020

Fig. 10a

| LDB#X | V | TID#? | A1 | A1 | A1 | A1 | A1 | A1 | A1 | A1 | A1 | A1 | A1 | ⟩1000
|---|---|---|---|---|---|---|---|---|---|---|---|---|---|---
| LDB#X | W | TID#Y | | | | | | | | | | | | ⟩1010
| | U | | | | | | | | | | | | | ⟩1020

Fig. 10b

| LDB#X | V | TID#? | A1 | A1 | A1 | A1 | A1 | A1 | A1 | A1 | A1 | A1 | A1 | ⟩1000
|---|---|---|---|---|---|---|---|---|---|---|---|---|---|---
| LDB#X | T | TID#Y | A2 | A2 | A2 | A2 | A2 | A2 | A1 | A1 | A1 | A1 | A1 | ⟩1010
| LDB#X | W | TID#Y | | | | | | | | | | | | ⟩1020

Fig. 10c

| LDB#X | V | TID#? | A1 | A1 | A1 | A1 | A1 | A1 | A1 | A1 | A1 | A1 | A1 | ⟩1000
|---|---|---|---|---|---|---|---|---|---|---|---|---|---|---
| LDB#X | T | TID#Y | A2 | A2 | A2 | A2 | A2 | A2 | A1 | A1 | A1 | A1 | A1 | ⟩1010
| LDB#X | T | TID#Y | A2 | A2 | A2 | A2 | A2 | A2 | A2 | A2 | A2 | A2 | A2 | ⟩1020

Fig. 10d

| LDB#X | V | TID#? | A1 | A1 | A1 | A1 | A1 | A1 | A1 | A1 | A1 | A1 | A1 | ⟩1000
|---|---|---|---|---|---|---|---|---|---|---|---|---|---|---
| LDB#X | D | TID#Y | A2 | A2 | A2 | A2 | A2 | A2 | A1 | A1 | A1 | A1 | A1 | ⟩1010
| LDB#X | T | TID#Y | A2 | A2 | A2 | A2 | A2 | A2 | A2 | A2 | A2 | A2 | A2 | ⟩1020

Fig. 10e

| LDB#X | D | TID#? | A1 | A1 | A1 | A1 | A1 | A1 | A1 | A1 | A1 | A1 | A1 | ⟩1000
|---|---|---|---|---|---|---|---|---|---|---|---|---|---|---
| LDB#X | D | TID#Y | A2 | A2 | A2 | A2 | A2 | A2 | A1 | A1 | A1 | A1 | A1 | ⟩1010
| LDB#X | V | TID#Y | A2 | A2 | A2 | A2 | A2 | A2 | A2 | A2 | A2 | A2 | A2 | ⟩1020

Fig. 10f

METHOD AND ARRANGEMENT FOR PERFORMING ATOMIC UPDATES USING A LOGICAL FLASH MEMORY DEVICE

BACKGROUND OF THE INVENTION

The invention concerns generally the technology of handling updates which may consist of several lower-level operations which must all succeed or all fail in a consistent manner. Especially the invention concerns the technology of utilizing a memory address translation layer when performing transactions.

The concept of performing a transaction is widely used in the field of maintaining file systems where integrity of data and obedience to certain business rules are of primary concern. As an example we may consider a banking application where an accounts file lists all accounts with their currently valid balance, and a separate account entries file lists all performed account entries. Let us assume that a new record has been made to the account entries file, describing the payment of a certain sum of money to or from a certain account. However, a corresponding update operation to the accounts file was not performed. The result is a violation of data integrity in the file system: the balance of a certain account read from the accounts file is not the same as the one obtained by going through the records in the account entries file. This kind of conflict is usually known as a transaction consistency violation. Another example of a dangerous situation is a so-called business rule violation, which means that a certain application-specific rule is violated: for example an entry was made to an account that should have already been closed for approval.

The concept of transaction means that all such lower-level operations that cause changes to the data in a file system are grouped together to form an entity where all operations must either succeed together or fail together. The lower-level operations are also known as update operations. A transaction is usually divided into three successive phases, namely starting a transaction, updating data, and committing the transaction. If a fatal system failure (e.g. a system reset) occurs, either all update operations are performed or no changes are made to the data, depending on whether the commit phase had been reached or not. A fatal system failure during an already started commit phase causes it to be suspended but finished at the next start-up of the system. If the fatal system failure occurred before a transaction reached its commit phase, all traces of that transaction are automatically deleted during the next start-up.

The transaction mechanism usually supports a reverse operation known as the rollback transaction, which means canceling all update operations that were made at the updating phase instead of making them permanent through committing.

FIG. 1 illustrates a simple, conventional file system which can be used to perform transactions. A control unit 101 manages both a log file 102 and a database file 103. The control unit 101 writes the operations that constitute a transaction first into the log file 102 according to arrow 104. After all operations have been successfully written into the log file 102, the control unit 101 rewrites them, i.e. makes the corresponding changes, to the database file 103. This operation may be seen as transferring the changes from the log file 102 to the database file 103 according to arrow 105.

If we compare the log file arrangement of FIG. 1 to a straightforward non-transaction oriented updating of data in the database file 103, we note that the former doubles the amount of file write operations and introduces a file read operation which is not present in the latter. It is clear that such loading of the file system must have certain harmful effects especially in large-scale systems like banking applications where the daily number of transactions is easily in the order of hundreds of thousands or millions.

BRIEF SUMMARY OF THE INVENTION

It is an object of the present invention to provide a method and an arrangement for performing transactions with less loading to a file system than in the prior art arrangement of FIG. 1. It is also an object of the invention to provide a method and an arrangement for performing transactions reliably and economically. A further object of the invention is to provide such a method and arrangement so that they are easily scalable to take into account the number of transactions per unit time.

The objects of the invention are achieved by using a flash memory or a similarly functioning device as a data storage, and operating on the payload data contents and memory address information of said data storage according to certain sequential order.

The method for updating a first block of digital data according to the invention is characterized in that it comprises, in the following order, the steps of activating a first identifier which is common to all those update operations that concern the first block of data and must either all succeed together or all fail together performing all those update operations that concern the first block of data and must either all succeed together or all fail together storing the updated first block of digital data into a logical flash memory device together with a value that associates the updated first block of data with said first identifier and deactivating said first identifier.

The invention also applies to a method for recovering from a system failure in a file system based on a logical flash memory device. It is characterized in that it comprises the steps of checking from a list of active identifiers, which identifiers were active at the moment of occurrence of the system failure and checking physical memory locations in order to locate blocks of data that contain a value associating them with an identifier that was active at the moment of occurrence of the system failure, and setting a state indicator of each such nonvolatile memory location that contains such a block of data to a value that indicates that the memory location contains invalid data.

The invention also applies to an arrangement which is characterized in that it comprises a logical flash memory device means for activating a first identifier which is common to all those update operations that concern the first block of data and must either all succeed together or all fail together means for performing all those update operations that concern the first block of data and must either all succeed together or all fail together means for storing the updated first block of digital data into said logical flash memory device together with a value that associates the updated first block of data with said first identifier and means for deactivating said first identifier.

A first typical feature of flash memories is a certain disposable nature of physical memory locations. Another typical feature, which is a kind of consequence from said first feature, is the arrangement of such memories into blocks that are separately accessible using a certain set of access rules. According to the present invention a number of blocks are used to store non-updated and updated versions of certain payload data the contents of which are subject to updating through transactions. Address and header information of said blocks are used to declare, which block contains the most valid version of payload data at any given time instant.

The concept of flash memories may be broadened to cover Logical Flash Memory Devices or LFMDs, i.e. arbitrary memory means that are arranged to operate according to said typical features of flash memories: organisation of stored data into blocks, one-time nature of writing into blocks, state indicators to indicate the state of data in the blocks. The general definition of LFMDs covers also hybrid solutions which use at least two physically separate storage locations to store a logically integral block of data.

For example a conventional magnetic disk drive or a static RAM (Random Access Memory) may be arranged to operate like an LFMD. Full emulation of the flash memory features is usually not required of a magnetic disk drive: typically the physical erasing of data blocks is not implemented therewith. Combinations of magnetic disk drives and actual solid-state flash memories offer an advantageous framework for hybrid solutions: for example the data block header (or a part of it like the state indicators) may be stored in the flash memory while the rest of the block, especially the data payload, is stored on the magnetic disk drive. Despite of the two physically separate locations the data block is logically integral. The present invention is equally applicable to all LFMDs independently of whether they are physically based on the flash technology or not.

As an enabling feature to the invention, a fail-safe atomic updating procedure of a smallest updateable data unit is provided. Such a data unit comprises a header field with a certain state indicator that has a limited number of allowed values. The state indicator of an updated data unit is changed to indicate validity of the corresponding payload data when the updated data has been written thereto. Thereafter the state indicator of the corresponding old data unit is changed to indicate that the old payload data is obsolete.

A certain transaction identifier is temporarily stored to indicate that a corresponding transaction is in progress. All update operations that are part of said transaction are marked with the same transaction identifier or an identifier unambiguously associated thereto. After all update operations have been performed, the transaction is committed by removing the transaction identifier from its temporary storage or by otherwise marking it to indicate completeness of the transaction.

Support for multiple parallel transactions that operate on non-overlapping portions of data stored within a single updateable block can be added by allocating a separate temporary storage location for the data to be updated per each parallel transaction.

The parallel updating operations are performed within the temporary storage locations and only thereafter the actual storage memory locations are updated.

The invention allows the handling of transactions to be brought onto a very low hierarchical level (into a file system), which in turn offers many advantages. The applications that represent higher hierarchical levels and use the file system for storing data do not need to know, how the actual transaction handling is implemented. The file system level implementation of the transaction handling is independent of the implementation of the higher-level applications, which makes the transaction handling very robust and easily adaptable to different kinds of applications. The upper hierarchical levels may in turn comprise further, more complicated operations that rely on the principle of completing either all or none of their subparts.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 illustrates a conventional file system update,
FIG. 2 illustrates the known hierarchy of concepts in a flash memory,
FIG. 3 illustrates a known address translation layer,
FIGS. 9a to 9h illustrate a method for performing parallel flash memory transactions
FIGS. 10a to 10f illustrate a method for performing flash memory transactions with chained write operations and
FIG. 11 illustrates an arrangement according to an embodiment of the invention.

DETAILED DESCRIPTION OF THE INVENTION

Figure 4:
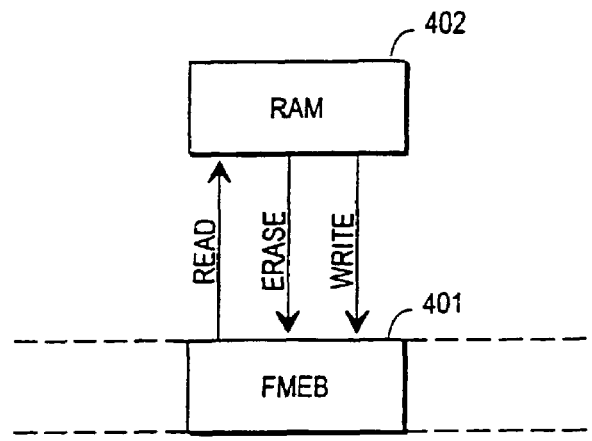
FIG. 4 illustrates a known way of updating data.

FIG. 1 has been treated above in the description of prior art, so the following description of the invention with its advantageous embodiments will focus on FIGS. 2 to 11.

To provide full understanding of the invention we will first briefly describe some known features of flash memories and other devices that have logically a similar structure and operation. Flash memory data cannot generally be updated to the same physical memory position without first erasing a complete logical block of memory. After a block level erasure all bits within the erased block have a common first constant value, usually 1. Each bit within the block can then be separately written once by changing its value to a second constant value, usually 0. Thereafter the only way to change the value of the bit is to erase the whole block again.

FIG. 2 illustrates schematically a flash memory device 201 which is divided into Flash Memory Erase Blocks or FMEBs. There are in general a large positive integer number M of FMEBs of which four (202, 203, 204 and 205) are separately shown in FIG. 2. An FMEB is the smallest logical memory unit that can be erased independently from the other parts of the memory device. The size of an FMEB depends on the memory device type and is typically from 4 kB to 64 kB, where kB means kilobytes.

Each FMEB consists of one or more Logical Data Blocks or LDBs. FIG. 2 illustrates the division of the first FMEB 202 into N LDBs, of which five (206, 207, 208, 209 and 210) are separately shown. An LDB is the smallest updateable data unit in the logical flash data block device. Conceptually it is equal to a data sector in a hard disk drive. Each LDB is further divided into an LDB Header or LDBH, designated as 211 in FIG. 2, and a payload data or LDB Data part 212, known by the acronym LDBD. The former comprises especially an LDB identifier field 213 the contents of which are used to unambiguously identify each LDB, and a state field 214 which indicates the validity of the data in the corresponding physical storage area.

Since the bit values within an LDB can only be written once, arbitrary updating of the payload data in an LDB is only possible by writing the whole LDB into a "virginal" or "clean" memory location that has not been touched since the last block level erasing. The old storage location may be declared dirty by giving a corresponding value to the state indicator within its LDBH.

Previously we have hinted at the possibility of storing the LDB into at least two physically separate locations. From the logical point of view the physical storage format has no significance, as long as suitable logical to physical conversions are provided to make the data block to appear as a logically integral entity. Such conversions and their practical implementations are known as such to the person skilled in the art.

FIG. 3 illustrates schematically a Logical To Physical flash memory address Translation Layer or LTPTL which is a kind of conversion table that associates a physical memory location address with each LDB identifier. When a certain LDB must be read, the system refers to the LTPTL to obtain the physical memory address which currently contains that particular LDB. The procedure is known as Logical to Physical Address Mapping or LPAM. Updating an LDB means that its location in the physical flash memory changes. A corresponding change is made in the LTPTL so that the new physical storage address therein points to the new storage location that contains the updated LDB.

As we have noted above, a memory arrangement may operate according to the principles explained above with reference to FIGS. 2 and 3 independently of whether its physical implementation relies on actual flash technology or not, or whether the physical storage of the data block takes place in one ore several separate locations.

FIG. 4 illustrates a known way of updating data "in place" within a flash memory. At the first step the contents of a whole FMEB 401 are read into a volatile memory 402 which is typically a Random Access Memory or RAM. Such a memory does not place limitations to repeated back and forth conversions of bit values, so the second step is to update the data within the RAM 402. At the third step the original FMEB location 401 is erased, and at the fourth step the updated data is written back to its original flash memory location. If any fatal errors occur during either the third or fourth step, valid data is likely to be lost since they are only present in the volatile memory. An additional disadvantage of the method of FIG. 4 is that erase-on-write type updating is generally very inefficient and may cause early ageing of the flash memory.

Figure 5A:
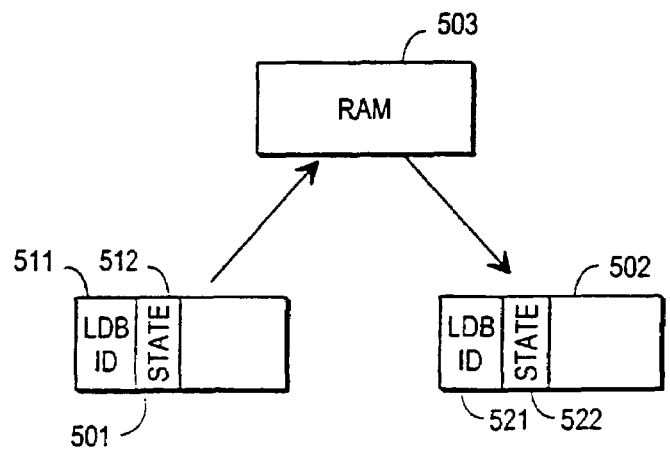
FIG. 5a illustrates an arrangement for a fail-safe atomic update operation.
Figure 5B:
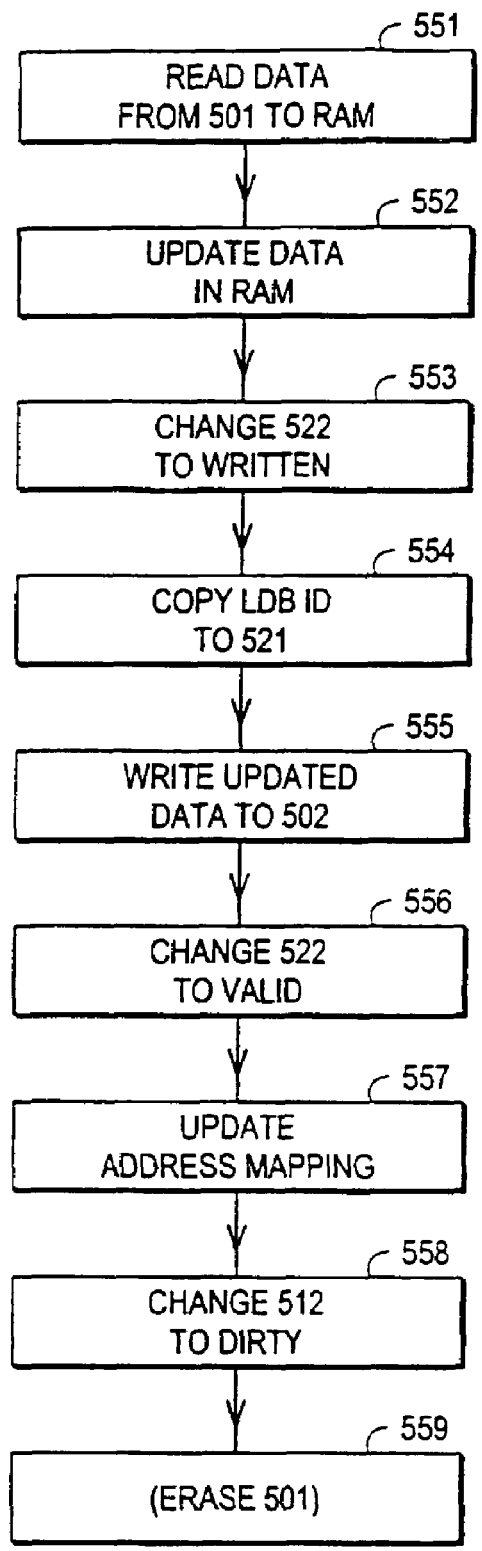
FIG. 5b illustrates a method for a fail-safe atomic update operation.

FIGS. 5a and 5b illustrate a fail-safe atomic updating procedure of an LDB. Two physical memory locations 501 and 502 of the size of an LDB are shown. We will assume that a set of allowed values has been defined for the state field within the LDBH so that at least such states as "Unused", "Written", "Valid", "Dirty" and "Broken" can be indicated. Of these, the state "Broken" means that the corresponding physical memory location is not functioning properly so that it should not be used at all. The "Broken" state relates to general use of memory devices and has no importance to the present invention. Additionally there appears in FIG. 5 a certain volatile memory 503 which is available as a working space.

The first step 551 of updating the data stored in the payload part of the LDB currently residing in a first memory location 501 is to read the payload part into the volatile memory 503. Updating the data in the volatile memory 503 constitutes the next step 552. This far the method resembles the conventional non fail-safe method of FIG. 4. However, the updated data is not written into the same physical memory location, but to a fresh memory location 502. A carefully designed sequence of successive steps is obeyed in order to ensure that a valid copy of data is always available even after an unexpected system failure.

At step 553 the state indicator field 522 of the second memory location 502 is changed from "Unused" to "Written". At step 554 the LDB identifier is copied from the LDB identifier field 511 of the first memory location 501 to the LDB identifier field 521 of the second memory location 502. The LDB identifier may have been read from the first memory location together with the payload data already at step 551, or it may have been obtained previously from elsewhere (e.g. the LTPTL), so an actual read operation from the first memory location is most advantageously not necessary any more at step 554. However, conceptually it is easiest to think that a part of the procedure of preparing the new memory location 502 is to copy the LDB identifier directly from the old memory location 501. At step 555 the updated payload data is written into the payload data field 523 of the new memory location 502. The mutual order of steps 554 and 555 may be changed without notable implications to the applicability of the invention.

Only after the writing of both the LDB identifier and the updated payload data into the new memory location 502 have been successfully completed, the state indicator in the corresponding field 522 of the new memory location 502 is changed from "Written" to "Valid" at step 556. Thereafter the logical to physical flash memory address mapping is updated at step 557 so that it associates the LDB identifier (which appears now identically in both identifier fields 511 and 521 of the old and new memory locations respectively) with the new physical memory location 502. At step 558 the state indicator in the corresponding field 512 of the old memory location 501 is changed from "Valid" to "Dirty". At some later time instant there comes a step 559 where the FMEB (not shown) which the old memory location belongs to will be erased, which simultaneously changes the state indicator in the corresponding field 512 of the old memory location 501 from "Dirty" to "Unused".

The relation of the step where the logical to physical flash memory address mapping is updated is not critical. Most advantageously it is performed after the step where the updated payload data is written into the new memory location and before the step where the old memory location gets erased, or at least before the updated payload data is accessed for the next time. In the following we discuss some considerations that relate to the location of the updating step of the logical to physical flash memory address mapping.

The applicability of the method illustrated in FIGS. 5a and 5b to transaction handling in general arises from the fact that at each moment of time there is a certain copy of the data available in a nonvolatile flash memory. The following state table illustrates the values in the state indicator fields after each step shown in FIG. 5b.

TABLE 1

| | 551 | 552 | 553 | 554 | 555 | 556 | 557 | 558 | 559 |
|---|---|---|---|---|---|---|---|---|---|
| 512 | Valid | Valid | Valid | Valid | Valid | Valid | Valid | Dirty | Unused |
| 522 | Unused | Unused | Written | Written | Written | Valid | Valid | Valid | Valid |

The general rule for recovering from an unexpected fatal failure is to choose the data from the memory location where the LDB state indicator field indicates that the data is valid. However, we see from Table 1 that after the end of step 556 and before the start of step 558 there is a short period during which both memory locations claim to comprise valid data, although the data in the new memory location is updated and the data in the old memory location is not. A simple rule for recovering from such a situation is to randomly choose one of the memory locations where the LDB identifiers are equal and throw the other one away, i.e. change its state indicator from "Valid" to "Dirty". If the old memory location is thereby chosen as valid, the unupdated data remains valid and the attempted updating is deemed to not have taken place at all. If the new memory location is chosen, the attempted updating is deemed to have been successful.

There exists a way of handling the "valid+valid" situation which is only slightly more complicated than said random selection but replaces the indefiniteness associated with random selection with full determinism. The LDBs may be specified to comprise a number of bits that serve as cyclic indicators of order according to age. The simplest possible cyclic indicator consists of two bits. Every time an LDB is written to a flash memory, the value of the indicator bits is advanced from their previous value according to a cyclic pattern, most straightforwardly according to the pattern 00→01→10→11→00 and so on (or, if single bit value changes at each time are preferred, 00→01→11→10→00 and so on). If two copies of the same LDB are found in a memory, by comparing their cyclic indicator bits it is easy to see which one of them is older and which one is newer. The usability of a cyclic indicator with a certain number of bits relies on the assumption that old copies of the same LDB will be marked as "Dirty" or erased before the cycle of indicator values has been exhausted. The larger the number in the cyclic indicator, the longer is the cycle of values and correspondingly the longer is the "LDB history" which can be unambiguously traced by looking at the cyclic indicator values.

Underlining and bold typeface emphasize the memory location in Table 1 from which data can be validly read.

Figure 6:
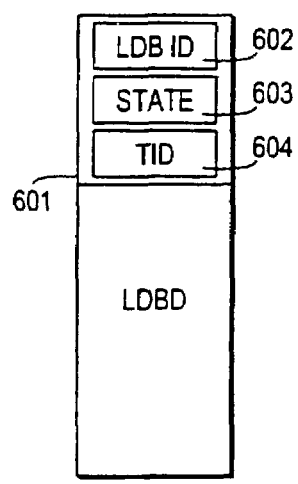
FIG. 6 illustrates a data block structure which may be used in association with the invention.

Based on the above-given description of a fail-safe atomic updating procedure we will now describe an advantageous embodiment of a complete flash memory transaction. Let us assume that a further field is added to the LDB header of each LDB in the system. FIG. 6 illustrates schematically an LDB 601 where the header part comprises an LDB identifier field 602, an LDB state indicator field 603 and a transaction identifier field 604. Let us further assume that the allowed values of the LDB state indicator field 603 correspond to the states "Unused", "Written", "TransactionWritten", "Valid", "Dirty" and "Broken" where the state "TransactionWritten" is an addition to what has been described above. Additionally we assume that the system has conceptually a selection of transaction identifiers at its disposal so that each transaction identifier is either in use ("active") or free ("inactive") at a given time instant, and that at least one LDB is allocated as the storage area of active LDBs. We will refer to this particular LDB as the LDB#T.

Figure 7:
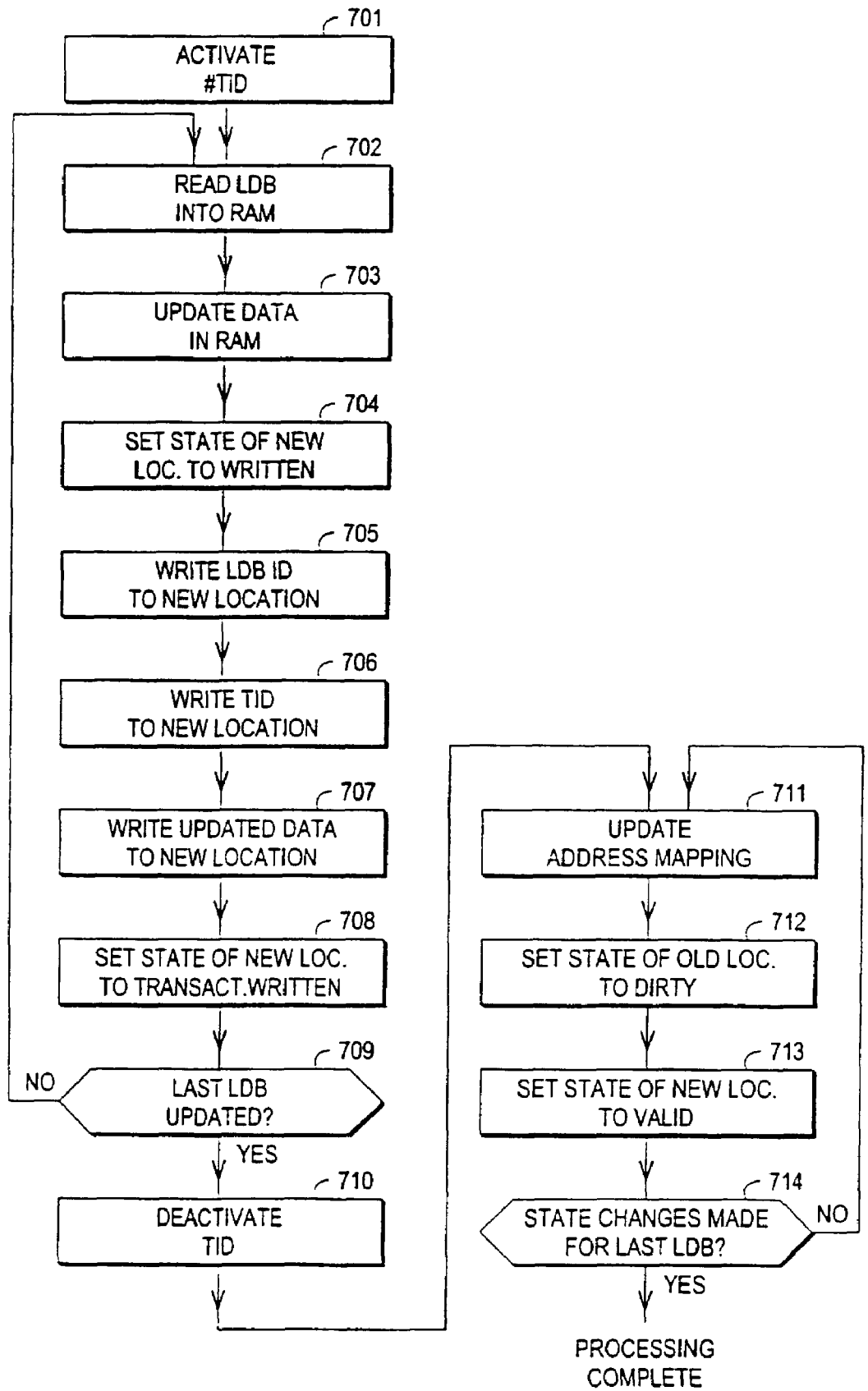
FIG. 7 illustrates a method for performing flash memory transactions.

Referring now to FIG. 7, at step 701 a transaction is started by activating a transaction identifier, i.e. selecting a hitherto inactive transaction identifier and writing it into LDB#T. We will refer to this particular transaction identifier as the #TID. The writing is accomplished by using the fail-safe atomic update procedure described above with reference to FIGS. 5a and 5b. After the successful activation of the #TID the transaction is considered to have been started.

The concept of activating a transaction identifier is of general importance to the present invention and it should be understood that writing it into LDB#T is not the only possible practical implementation. Within the context of the present invention, activating a transaction identifier is understood to mean all such procedures that have the effect of putting a transaction identifier into a certain first state from which it can be unambiguously recovered even after a system failure. Correspondingly deactivating a certain transaction identifier means putting it into a certain second state which is unambiguously distinguishable from said first state even after a system failure. All such transaction identifiers that have been activated and not yet subsequently deactivated may be designated as active transaction identifiers.

The actual updating of data in the context of a flash memory transaction consists of a number of updating operations each of which concerns a single LDB. At step 702 the contents of an LDB identified by a certain LDB identifier LDB#X are read from a first flash memory location into a volatile workspace memory, and at step 703 the data contained in the payload data part thereof is updated. At step 704 the state indicator field of a fresh, second flash memory location is changed from "Unused" to "Written", and at step 705 the LDB#X is written into the LDB identifier field of the second memory location. At step 706 the #TID is written to the transaction identifier field of the second memory location and at step 707 the updated data is written into the payload data part of the second memory location. Steps 705, 706 and 707 can be also in some other mutual order. After the second memory location has been successfully provided with the correct LDB identifier (LDB#X), transaction identifier (#TID) and updated payload data, the value of its state indicator field is changed from "Written" to "TransactionWritten" at step 708.

At step 709 there is a check whether the finished LDB updating operation was the last one of the flash memory transaction. A negative finding at step 709 means that there are still other LDB updating operations to be performed in the context of the current transaction, so step 702 is returned to with the exception that the starting point may be a different LDB than previously and the updated results are written into a different second memory location than previously. A positive finding at step 709 means that the data updating associated with the current transaction has been finished, so the transaction may proceed to its commit phase.

The commit phase of the flash memory transaction illustrated in FIG. 7 consists of step 710, where the #TID is removed from the LDB#T. The fail-safe atomic updating procedure is used also to effect the removing. At this point is should be noted that all old memory locations that were subject to updating in association with the transaction are still declared valid by their state indicator fields. Therefore the transaction continues with the loop consisting of steps 711, 712, 713 and 714. At step 711 the logical to physical flash memory address mapping is updated so that it associates the LDB identifier LDB#X with the new physical memory location. The actual location of the address mapping update step in relation to the other method steps is of no significance as was explained previously in association with the fail-safe atomic update procedure. At step 712 the state indicator of a certain first memory location which houses the old, unupdated version of a certain data block known as LDB#X is changed from "Valid" to "Dirty".

At step 713 the state indicator of a corresponding second memory location which houses the new, updated version of the data block known as LDB#X is changed from "TransactionWritten" to "Valid". It is not necessary to explicitly perform step 713 if the same transaction identifier is not reused; we will explain more about delayed step 713 later. Step 714 is a check of whether all LDBs that were associated with the committed transaction have undergone the changes made in steps 711, 712 and 713; a negative finding means a return to step 711 to process another first-second memory location pair, and a positive finding at step 714 means that the processing of the transaction has been completed.

The following state table illustrates the values in the state indicator fields in a certain old and new memory location after each step shown in FIG. 7. Abbreviations U for "Unused", W for "Written", T for "TransactionWritten", V for "Valid" and D for "Dirty" have been used for brevity.

state before it is erased. A background cleanup routine continuously monitors the state of the flash memory and tries to make free storage space by moving data blocks around and erasing FMEBs. Additionally in some cases it may happen that the system failure took place at a very early stage of operation where there are no "old" copies of the LDBs since the flash memory was clean before the first transactions to be performed caused the "new" copies to be written to the flash memory.

If a fatal system error occurs after the completion of step 710, i.e. after the transaction identifier #TID has been removed from the allocated storage of active transaction identifiers, it is certain that all LDB updates have been performed correctly. Therefore it is safe to declare that the transaction was executed successfully and the updated LDBs may be read from the "new" memory locations at the next system startup. In this case all those physical memory locations are marked as dirty which fulfil the following three criteria:

the value of their LDB identifier field also appears in the corresponding field of another (new) physical memory location the value of their state indicator fields indicates the state "Valid"

TABLE 2

| | 701 | 702 | 703 | 704 | 705 | 706 | 707 | 708 | 709 | 710 | 711 | 712 | 713 | 714 |
|---|---|---|---|---|---|---|---|---|---|---|---|---|---|---|
| old | V | V | V | V | V | V | V | V | V | V | V | D | D | D |
| new | U | U | U | W | W | W | W | T | T | T | T | T | V | V |

Bold typeface and underlining emphasize in Table 2 the memory location in which valid data is available at any given moment. Let us analyze the validity of the data in the context of the general rules of handling transactions.

Previously we have noted that all update operations of a transaction must either succeed all fail together. The borderline between these two alternatives is the commit phase of the transaction. In FIG. 7 step 710 constitutes the commit step.

If a fatal system error occurs before the transaction has reached step 710, i.e. before the transaction identifier #TID has been removed from the allocated storage of active transaction identifiers, it is basically not certain whether all LDB updates have been performed correctly or not. Therefore the only reasonable alternative is to roll back the transaction, i.e. to nullify all update operations. In other words, at the next system startup after the fatal error all such physical memory locations are marked as dirty which fulfil one of the following two criteria:

the value of their state indicator fields indicates the state "Written"

the value of their state indicator fields indicates the state "TransactionWritten" and the transaction identifier found at their transaction identifier fields also appears in the allocated storage of active transaction identifiers.

In some cases the physical memory locations to be declared as dirty also fulfil the criterion that the value of their LDB identifier field also appears in the corresponding field of another (old) physical memory location. However, such a feature is not a reliable hallmark of physical memory locations to be declared as dirty for several reasons. The most important of them is the typical uncertainty of for how long the old physical memory location will remain in that the transaction identifier found at the transaction identifier field of the other (new) physical memory location that has the same LDB identifier does not appear in the allocated storage of active transaction identifiers.

Additionally all those physical memory locations are marked as valid which fulfil the following two criteria:

the value of their state indicator fields indicates the state "TransactionWritten"

the transaction identifier found at their transaction identifier field does not appear in the allocated storage of active transaction identifiers.

The above-mentioned step of changing the "TransactionWritten" blocks to "Valid" can be delayed until either the same TID that is stored in their transaction identifier field is activated for the next time or these particular blocks are subjected to new updating.

In analyzing what happens if a fatal system error occurs while the system is executing step 710, we must refer to the description of the fail-safe atomic update operation described in association with FIGS. 5a and 5b. There we gave rules for recovering from an unexpected failure, so in most cases there is no chance for indeterminacy. Only if we allow the random selection of either the old or new physical memory location when both are indicated as valid, it may happen that the state in which the flash memory was left at the moment of the fatal system error does not definitely determine the selection of either rolling back or committing an interrupted transaction at the next system startup. In the case of updating the LDB#T we may naturally stipulate that in such a "valid+valid" situation e.g. the memory location with a smaller (larger) number of transaction identifiers stored therein is always selected, so it is more (less) probable that step 710 will be interpreted as having been completed.

At the priority date of this application probably the most advantageous way is to use cyclic indicators as a part of the process of updating the LDB#T so that the above-described randomness can be removed.

Next we will describe the applicability of the invention to parallel transactions. One of the basic principles of transaction handling is that two parallel transactions are never allowed to update exactly the same logical data area in parallel. However, we may allow two or more parallel transactions to update non-overlapping portions of a certain LDB in parallel, as long as the commit phases of the transactions take place serially, i.e. the commit phase of a certain one of the parallel transactions may only begin if there is no other commit phase of another one of the parallel transactions simultaneously going on.

For simplicity we will only describe the effect of parallel transactions on a single LDB. However, nothing prevents from applying parallel transactions to updating an even a very large number of LDBs. The following description is easily generalized to cover such cases.

Figure 8:
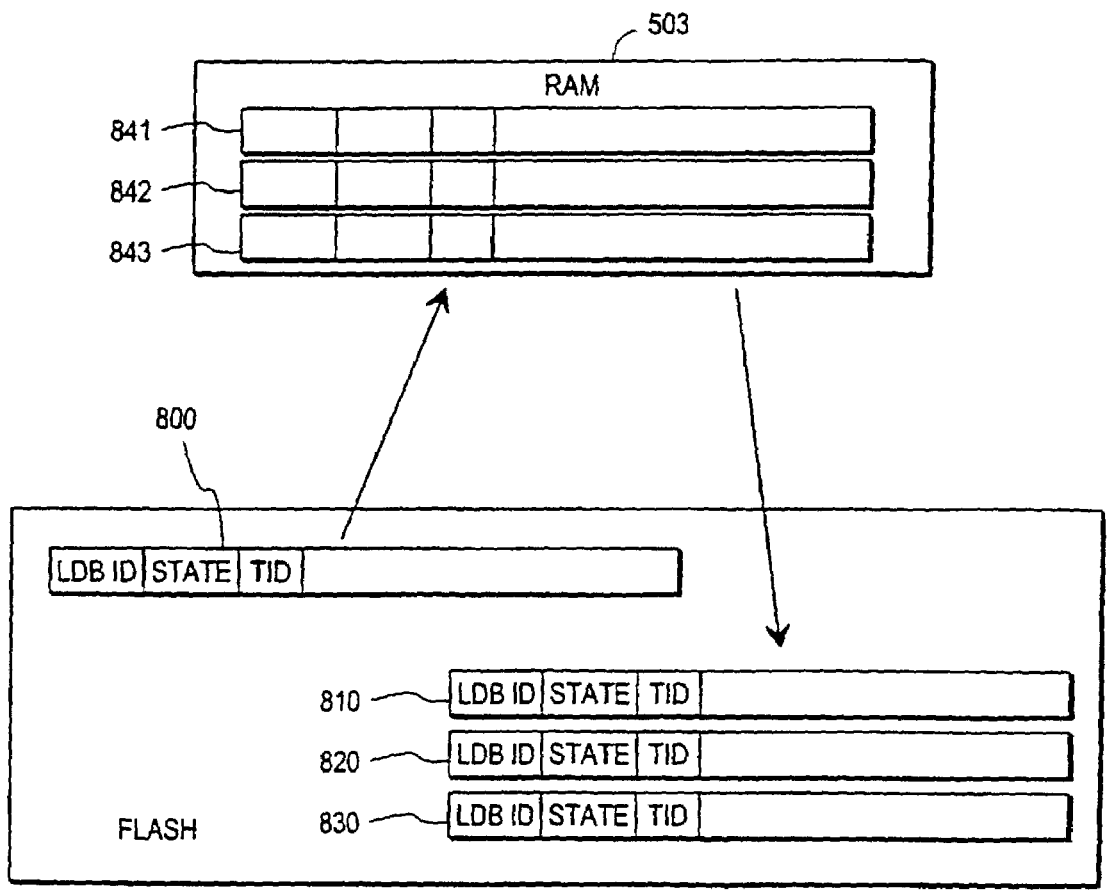
FIG. 8 illustrates an arrangement for performing parallel flash memory transactions

FIGS. 8 and 9a to 9j illustrate an arrangement and a method for performing parallel transactions using a flash memory. In FIG. 8 there are shown an old physical memory location 800, a number of new physical memory locations and a number of volatile (RAM) memory buffers. In order to handle parallel transactions there are advantageously as many new physical memory locations and as many volatile memory buffers as there are parallel transactions that have an effect upon a single LDB. Here we assume that the number of parallel transactions is three, so there are three new physical memory locations 810, 820 and 830 and three volatile memory buffers 841, 842 and 843. The three parallel transactions will be associated with certain transaction identifiers TID#A, TID#B and TID#C. Generally we may denote the number of parallel transactions by a positive integer N. The LDB structure is the same as above, i.e. in the LDB header part there are fields for an LDB identifier, an LDB state indicator and a transaction identifier. Let us denote the LDB which is the target of parallel updating as LDB#X. The contents of its TID field at the beginning of the execution of the parallel transactions is of no significance, so we may denote it by TID#?.

The requirement of there being as many new physical memory locations and as many volatile memory buffers as there are parallel transactions can be eased if the parallel transactions are active at very different times so that some of them make it to completion relatively early and the resources allocated to them may be released. Similarly the size of the volatile memory buffers may be optimized so that each volatile memory buffer is only of the size large enough to contain those data bits that the particular transaction using that volatile memory buffer is allowed to update. Especially the volatile memory buffers do not need to comprise storage space for the header fields of the LDBs to be updated; this fact is emphasized in the drawings by drawing the corresponding parts with dashed lines. Actually it is possible to realize the transactions even completely without volatile memory buffers, by using a fresh flash memory location for each step where new data replaces old data in the course of updating. Such "from flash to flash" updating is, however, usually highly inefficient in comparison to solutions where data is read from a logical flash memory device to volatile workspace memory in relatively large blocks, all updating is done in the volatile workspace memory and updated blocks are again written into the flash.

Figure 9A:
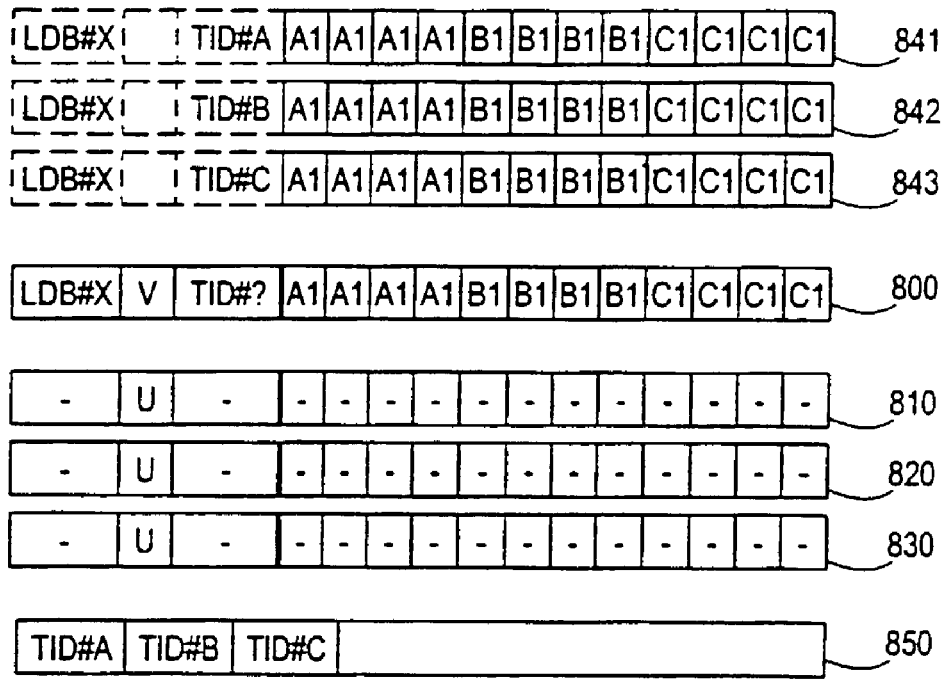

The data bits within the unupdated copy of LDB#X which a certain transaction TID#i is allowed to update are marked as il, where i=A, B, C. Here we assume that the parallel transactions are started more or less simultaneously, but this is not a binding requirement: one transaction may have been going on for a considerable time before another one is started. In our example the handling of the parallel transactions begins by writing the transaction identifiers TID#A, TID#B and TID#C into the storage of active transaction identifiers 850. Updating the data begins by reading the LDB#X from the old physical memory location 800 into all allocated volatile memory buffers 841, 842 and 843. FIG. 9a illustrates the situation after the read operations: at this stage no updates have yet been made to the data because the transactions were started simultaneously.

Each one of the parallel transactions is only allowed to update the data section associated with it in one of the volatile memory buffers, so we may assume that TID#A updates the A bits in buffer 841, TID#B updates the B bits in buffer 842 and TID#C updates the C bits in buffer 843. At this time no changes are made in the contents of the new physical memory locations 810, 820 and 830.

Figure 9B:
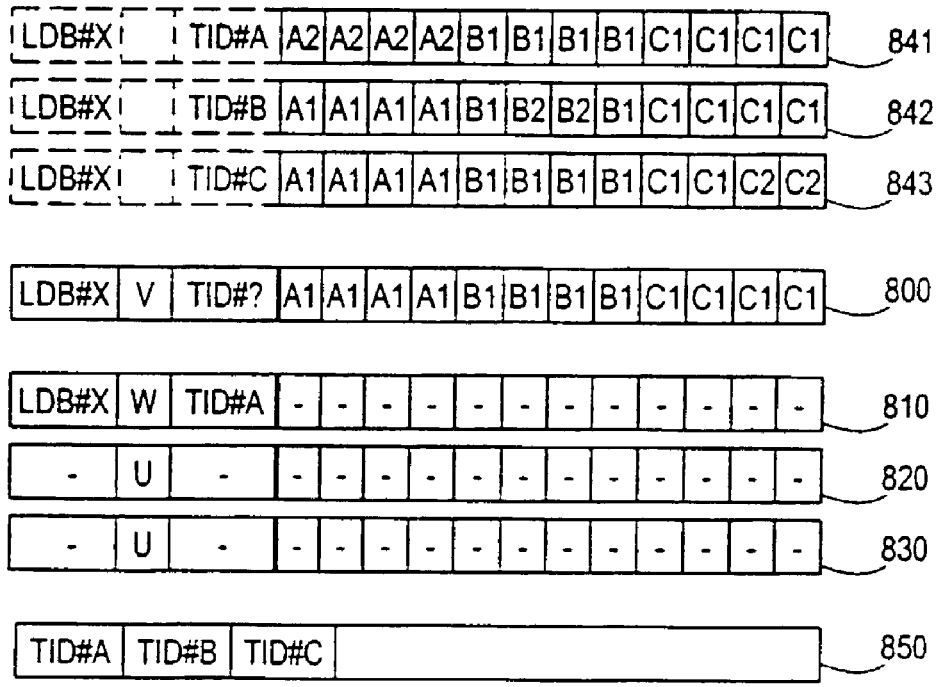

FIG. 9b illustrates the situation at the moment when the quickest one of the parallel transactions (say, transaction TID#A) has finished all updating that has to be performed in the corresponding volatile memory buffer 841: all A1 bits have been replaced with updated A2 bits. The contents of that volatile memory buffer are then written into the corresponding new flash memory location 810 according to the method steps explained previously in association with a single transaction. FIG. 9b shows how the writing has started by changing the state identifier from "Unused" to "Written" and by writing the LDB identifier LDB#X and the transaction identifier TID#A into the appropriate header fields.

Figure 9C:
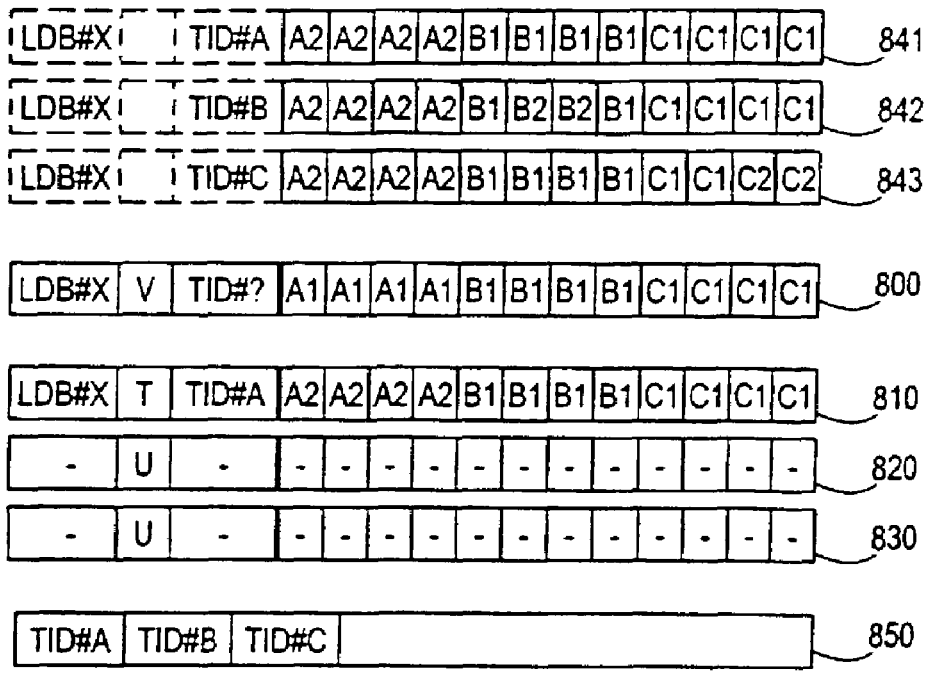

FIG. 9c shows how the contents of the first volatile memory buffer 841 have been written into the corresponding new flash memory location 810. Additionally FIG. 9c shows a step which is an important part of the handling of parallel transactions: the updates A1→A2 made by the first transaction are also copied to the other volatile memory buffers 842 and 843. The state identifier of the completed new flash memory location 810 is changed from "Written" to "TransactionWritten".

Figure 9D:
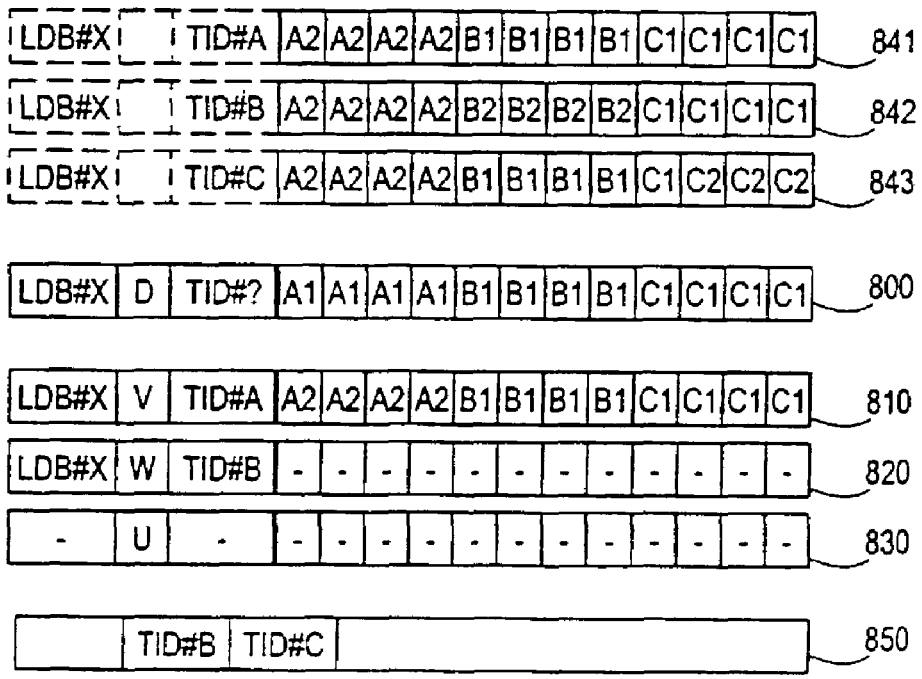

FIG. 9d shows two further development steps in the processing of the parallel transactions. The completed transaction TID#A is committed by removing its identifier from the storage of active transaction identifiers 850, changing the state indicator of the old physical memory location 800 from "Valid" to "Dirty" and changing the state indicator of the completed new physical memory location from "TransactionWritten" to "Valid". Simultaneously it happens that the second quickest transaction TID#B reaches a stage where all updates have been made in the volatile memory buffer 842, so writing to the corresponding flash memory location 820 may begin by changing the state identifier from "Unused" to "Written" and by writing the LDB identifier LDB#X and the transaction identifier TID#B into the appropriate header fields.

FIGS. 9e and 9f show repetitions of the steps shown in 9c and 9d respectively with the natural exceptions:
 in FIG. 9e the writing to the second flash memory location 820 gets completed and it is the B1→B2 updates that are copied to the remaining volatile memory buffers (the buffer 841 has most advantageously been deallocated at this stage, which is indicated by placing it into parentheses)
 in FIG. 9f transaction TID#B is committed (rendering the previously valid physical memory location 810 dirty and the newest completed physical memory location 820 valid) and it is the last transaction TID#C that finishes updating in volatily memory buffer 843 so that writing to the third flash memory location 830 may begin.

Figure 9G:
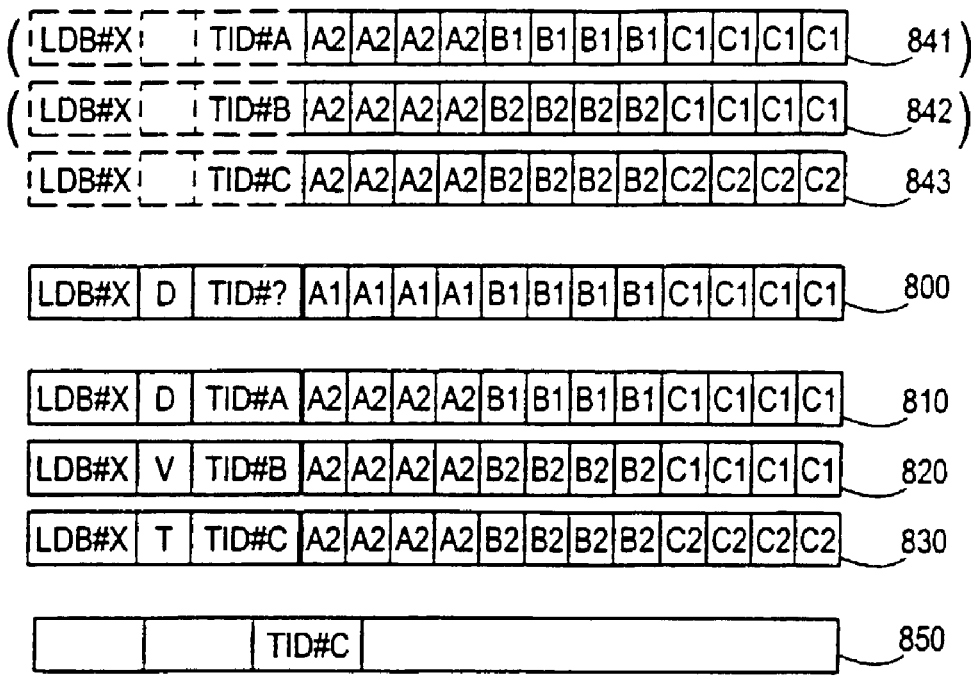
Figure 9H:
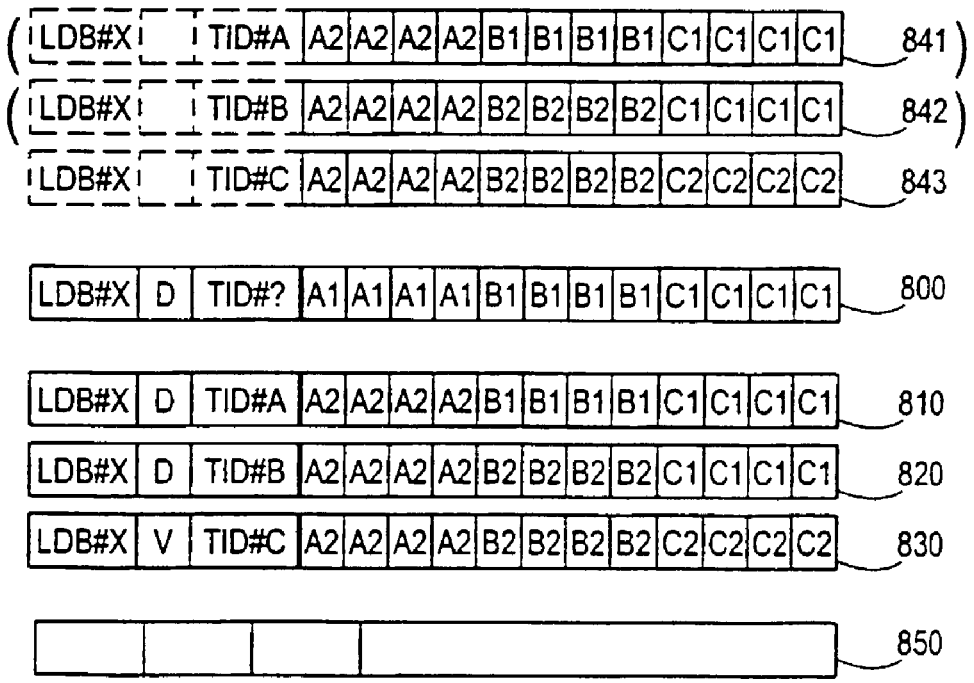

FIG. 9g shows a repetition of the steps shown in 9e with the natural exceptions that the writing to the third flash memory location 830 gets completed and the C1→C2 updates are not copied to any other volatile memory buffers since all other volatile memory buffers have most advantageously been deallocated at this stage. In FIG. 9h the completed transaction TID#C is committed by removing identifier TID#C from the storage of active transaction identifiers 850, changing the corresponding state identifier from "TransactionWritten" to "Valid" and marking the previously valid physical memory location 820 as "Dirty".

As with the atomic updating described earlier, the location of the steps where the LTPTL table is updated to point at the newest valid copy of a certain LDB is not important, although most advantageously it happens after said newest valid copy has been written into the flash memory and before the old, invalid copy gets erased.

The compliance of the above-described procedure with the general transaction handling rules is easily seen by analyzing the commit phases of the parallel transactions separately. All those transactions the identifiers of which were deleted from the storage of active transaction identifiers 850 before an eventual system error remain committed at the next system startup, because a flash memory location with the data updated by those transactions is found in a state "Valid". All those transactions which still had their identifiers stored as active are rolled back.

In the description of the invention's embodiments we have assumed so far that all updating of data is performed in the volatile workspace memory after the step of reading the old LDB from the logical flash memory device and before writing the new, completely updated version to the flash. For the sake of completeness we will next describe, with reference to FIGS. 10a to 10f an embodiment of the invention where so-called chained write operations to the flash memory are used. In order to keep the description simple we will only consider a single, non-parallel transaction, although the same principle is perfectly well suited also for parallel transactions.

FIG. 10a illustrates an old physical memory location 1000 and two new physical memory locations 1010 and 1020 at a starting phase where the data is read from the first-mentioned to a volatile workspace memory (not shown) for the first update. At the step shown in FIG. 10b the first updates made by a transaction known as TID#Y are ready so the writing of the partly updated LDB into the first new physical memory location 1010 begins. Here again we assume that the header fields are written first and the state indicator gets the value "Written". At the step shown in FIG. 10c the writing of the partly updated copy has been finished, so the state indicator thereof has been changed to "TransactionWritten". At the same time the second updates are approaching completion so the writing to the second new physical memory location 1020 may begin.

FIG. 10d shows a step where also the writing of the completely updated copy has been finished, so also the state indicator thereof has been changed to "TransactionWritten". FIG. 10e shows how the state indicator of the older, partly updated version is changed to "Dirty" while the transaction still remains uncommitted. The next step is the committing of the transaction by removing TID#Y from the storage of active transaction identifiers (not shown). Committing must be done at a stage where there is only one updated version of data left in the "TransactionWritten" state, since multiple updated versions in that state would cause ambiguity at next startup if a system error occurred immediately after committing. The final step shown in FIG. 10f comprises the updating of the state indicators so that the second new physical memory location 1020 now has valid data and the other physical memory locations are dirty.

There exist several alternative orders in which the state indicators of the physical memory locations may be changed in the case of chained write operations. For example, the state of the partly updated copy in the first new physical memory location 1010 may be changed to "Dirty" even before writing to the second new physical memory location 1020 begins. In other words the state indicators in FIG. 10c would be, from top to down, V, D and W, and in all further steps the state of the first new physical memory location would remain "Dirty". Another possibility is to change the state of the partly updated copy in the first new physical memory location 1010 to "Dirty" after the writing to the second new physical memory location 1020 has begun but before the state of the latter is changed from "Written" to "TransactionWritten". In other words the first new physical memory location would be "Dirty" in FIGS. 10d, 10e and 10f.

The general approach explained previously in association with parallel transactions may be utilized to implement a RAM based flash memory write cache which would help to streamline the chained write operations approach. This means that a flash copy of a certain LDBD#X is always read into the RAM already when a transaction TID#X is updating LDB#X for the first time, and the partly updated versions are only written to the cache. Data is read from the flash memory to the RAM buffer even if there are currently no other transactions updating the same LDB. If there are other simultaneous transactions updating the LDB, the process of handling parallel transactions is directly applied. Write caching which is done during the execution of a transaction but before its commit phase is safe from the integrity of data point of view. It can significantly improve the performance of a file system especially in typical updates to an LDB in the context of a transaction are done only one bit or byte at the time.

Figure 11:
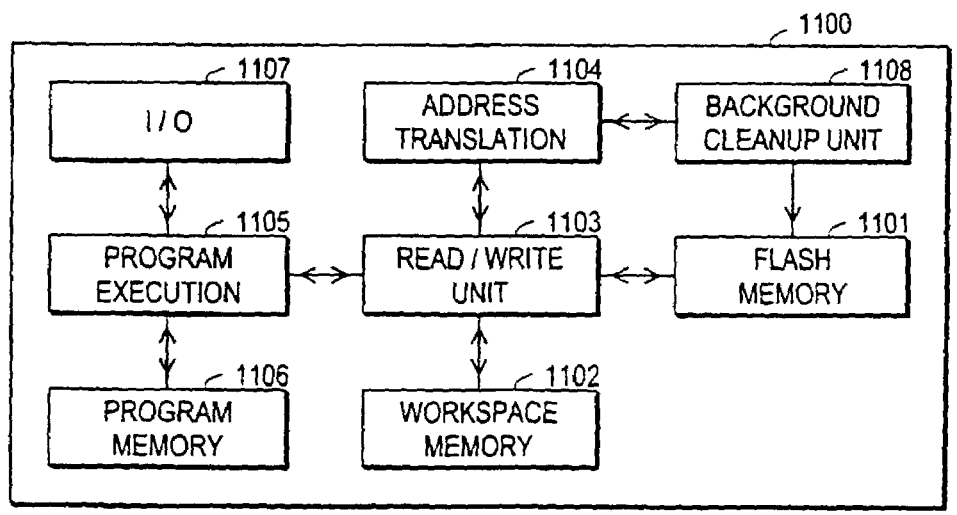

FIG. 11 illustrates schematically an arrangement 1100 according to an advantageous embodiment of the invention. The flash memory 1101 is linked to a workspace RAM 1102 through a read/write unit 1103 which performs the actual transferring of data between the two and uses the address mapping block 1104 to map logical data block identifiers to physical memory locations in the flash. A program execution block 1105 controls the operation by executing the instructions read from a program memory 1106 and/or obtained through an input/output interface 1107. The background cleanup unit 1108 maintains the condition of the flash memory 1101 in a way known as such.

The exemplary embodiments of the invention which were discussed above should not be construed to place limitations to the applicability of the invention also in other forms and alternative embodiments, which as such are obvious to the person skilled in the art in the light of the foregoing description and fall within the scope of the appended claims. For example even if we have stated that the transaction identifier as such is stored into the flash memory together with the updated LDB, the same effect can be reached by storing with the updated LDB some other value that unambiguously associates the updated LDB with a certain transaction identifier.

The invention claimed is:

1. A method of updating a block of digital data in which plural updating operations must either all succeed together or all fail together, the method comprising in order the steps of:
   providing a list of transaction identifiers that each are capable of temporarily uniquely identifying a group of the plural updating operations, each of the transaction identifiers being assigned to a group of the plural updating operations and designated active or not assigned to a group of the plural updating operations and designated inactive;
   changing an inactive one of the transaction identifiers to a first active transaction identifier that temporarily uniquely identifies a first group of the plural updating operations;
   first copying the block of digital data from a first memory location to a second memory location;
   updating the block of digital data by performing the first group of plural updating operations on the block of digital data in the second memory location;
   second copying the updated block of digital data from the second memory location to a third memory location,
   wherein each of the first and third memory locations has a state identifier that identifies a state of the data in the respective location,
   wherein after the updating step, the state identifier of the third memory location changes to a value indicating that the third memory location is undergoing a write operation,
   wherein after the second copying step, the state identifier of the third memory location changes to a value indicating that the third memory location contains data that has been updated as part of the first group of plural updating operations and then changes to a value indicating that the third memory location contains valid data; and
   changing the first active transaction identifier back to an inactive one of the transaction identifiers.

2. The method of claim 1, wherein the first active transaction identifier is stored in a nonvolatile memory allocated for storage of active identifiers.

3. The method of claim 1, wherein the step of first copying the block of digital data from the first memory location to the second memory location includes writing a cyclic indicator into the second memory, the cyclic indicator being advanced by one from a corresponding cyclic indicator in the first memory location.

4. An arrangement for updating a block of digital data in which plural updating operations must either all succeed together or all fail together, the arrangement comprising:
   means for providing a list of transaction identifiers that each are capable of temporarily uniquely identifying a group of the plural updating operations, each of the transaction identifiers being assigned to a group of the plural updating operations and designated active or not assigned to a group of the plural updating operations and designated inactive;
   means for changing an inactive one of the transaction identifiers to a first active transaction identifier that temporarily uniquely identifies a first group of the plural updating operations;
   means for first copying the block of digital data from a first memory location to a second memory location;
   means for updating the block of digital data by performing the first group of plural updating operations on the block of digital data in the second memory location;
   means for second copying the updated block of digital data from the second memory location to a third memory location,
   wherein each of the first and third memory locations has a state identifier that identifies a state of the data in the respective location,
   wherein said means for updating changes the state identifier of the third memory location to a value indicating that the third memory location is undergoing a write operation after performing the first group of plural updating operations on the block of digital data in the second memory location, and
   wherein said for second copying changes the state identifier of the third memory location to a value indicating that the third memory location contains data that has been updated as part of the first group of plural updating operations and then changes to a value indicating that the third memory location contains valid data after copying the updated block of digital data from the second memory location to the third memory location; and
   means for changing the first active transaction identifier back to an inactive one of the transaction identifiers.

* * * * *